(12) United States Patent
Reese et al.

(10) Patent No.: US 7,599,083 B2
(45) Date of Patent: Oct. 6, 2009

(54) REMOTE PRINTER MANAGEMENT VIA EMAIL

(75) Inventors: Curtis Reese, Boise, ID (US); Shane Konsella, Star, ID (US); Brett Green, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 997 days.

(21) Appl. No.: 10/650,165

(22) Filed: Aug. 28, 2003

(65) Prior Publication Data

US 2005/0049837 A1    Mar. 3, 2005

(51) Int. Cl.
 *G06F 3/12* (2006.01)
 *G06K 1/00* (2006.01)
(52) U.S. Cl. .................. 358/1.15; 358/1.9; 358/1.13
(58) Field of Classification Search ............. 358/1.1, 358/1.9, 1.11–1.18; 709/227
 See application file for complete search history.

(56) References Cited

U.S. PATENT DOCUMENTS

| | | | |
|---|---|---|---|
| 5,706,411 A | 1/1998 | McCormick et al. | |
| 5,727,135 A | 3/1998 | Webb et al. | |
| 6,317,848 B1 | 11/2001 | Sorens et al. | |
| 6,430,711 B1 | 8/2002 | Sekizawa | |
| 6,520,616 B1 | 2/2003 | Parks et al. | |
| 6,522,421 B2 | 2/2003 | Chapman et al. | |
| 6,543,875 B2 | 4/2003 | Gomez et al. | |
| 6,559,965 B1 | 5/2003 | Simpson et al. | |
| 6,931,447 B1 * | 8/2005 | Hemstreet et al. | ........... 709/227 |

OTHER PUBLICATIONS

Smith, R.; Wright, F.; Hastings, T.; Zilles, S.; and Gyllenskog, J.; Printer MIB, Network Working Group Request for Comments: 1759, The Internet Society, pp. 1-113, Mar. 1995.

Bergman, Ron; Lewis, Harry; and McDonald, Ira; Printer MIB V2, Printer MIB Working Group, The Internet Society, pp. 1-183, Feb. 19, 2003.

* cited by examiner

*Primary Examiner*—Dov Popovici
*Assistant Examiner*—Thierry L Pham (57) ABSTRACT

Various systems, methods, and computer programs are provided for remotely monitoring a printer status. In monitoring the printer status, one selects a printer status object from among a list of selectable printer status objects in a remote client in data communication with a printer. Thereafter, an email is generated in the remote client and a status request is written into the email in a printer management language native to the printer. The status request requests a current status of the printer status object in the printer. The email is transmitted to the printer through any firewalls. The printer generates a reply email that provides the desired status information and transmits the reply email to the requester.

15 Claims, 6 Drawing Sheets

REMOTE PRINTER MANAGEMENT VIA EMAIL

BACKGROUND

Information technology (IT) managers are often faced with the burdensome task of ensuring that all network components within a given environment such as a work site are operational. When an IT manager happens to be away from the work site, they typically cannot monitor the operational aspects of all of the network components such as printers and the like. As a consequence, an IT manager would have no way of knowing the status of a network component such as a printer while they are away from a work site. Often times, a problem experienced with network equipment such as printers might be simple to resolve, provided that the IT manager is made aware of the problem and can direct appropriate personnel to resolve the situation. Also, if the IT manager has the ability to monitor the status of network equipment such as printers from a remote location, then they might be able to anticipate problems that are likely to happen in the near future such as, for example, when printer consumables such as paper, toner, or ink are close to running out.

BRIEF DESCRIPTION OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION

Figure 1:
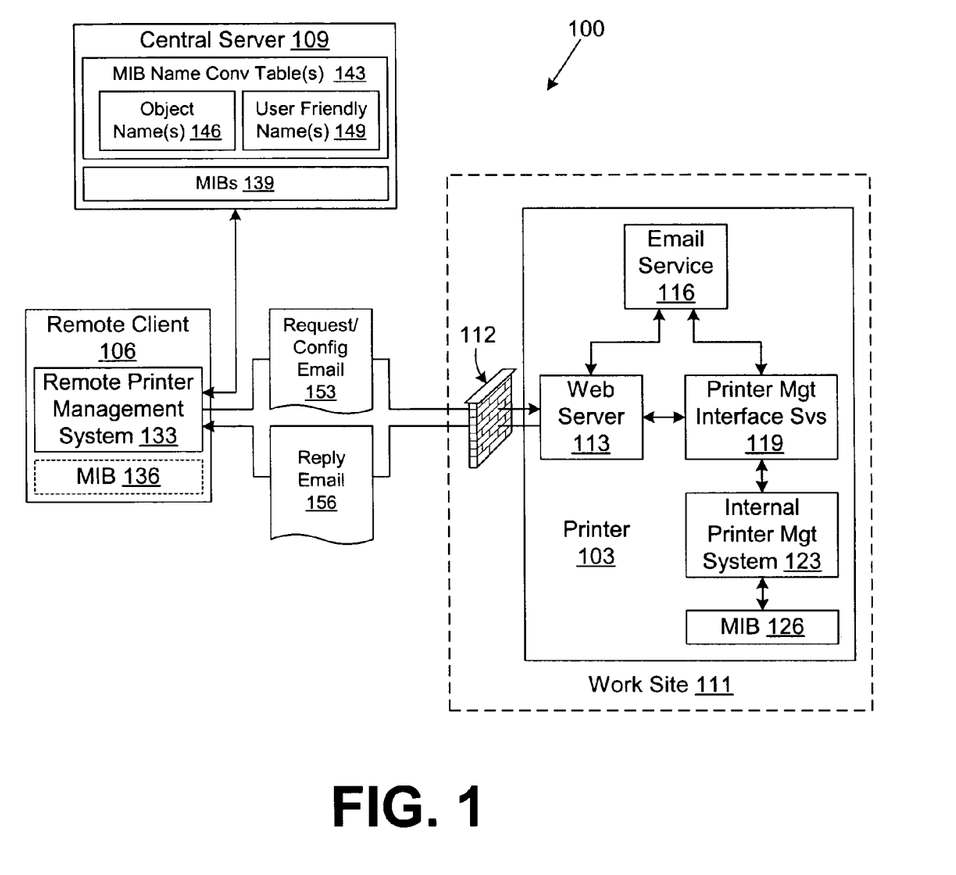
FIG. 1 is a functional block diagram of a network of devices that facilitates remote printer monitoring and management according to an embodiment of the present invention.

With reference to FIG. 1, shown is a block diagram of a remote printer management network 100 according to an embodiment of the present invention. The remote printer management network 100 includes, for example, a printer 103 and a remote client 106. In various embodiments, the remote printer management network 100 also includes a central server 109 as will be discussed. The printer 103 is network capable and includes functionality that may be accessed by the remote client 106 or other devices through an appropriate network as will be described. In this respect, the printer 103 may be coupled to a local area network within a particular work site 111 as can be appreciated by those with ordinary skill in the art. The local area network that services the work site 111 may be isolated from external networks by a firewall 112.

To facilitate such network access, the printer 103 includes a network server such as, for example, a web server 113. Also, to facilitate communication with external devices via electronic mail (email), the printer 103 also includes an email service 116. In addition, the printer 103 includes a printer management interface service 119 and an internal printer management system 123, both of which are executed in the printer 103 to provide access to printer status information that is stored in a management information database (MIB) 126 as will be described.

The remote client 106 includes a remote printer management system 133. Also, from time to time, a management information base 136 or select elements thereof is/are stored in the remote client 106 as will be discussed. In this respect, the management information database 136 may include elements of the management information base 126 stored in the printer 103. The remote client 106 may be, for example, a personal digital assistant, a laptop computer, or any other remote device with like capability.

The central server 109 may include one or more management information databases 139 corresponding to one or more printers 103. In addition, the central server 109 may also include management information database name conversion tables 143. Each of the management information database name conversion tables 143 maps one or more object names 146 to user friendly names 149. The object names 146 correspond to printer status objects and other objects maintained in the management information databases 126 associated with various printers 103. In this respect, each management information database name conversion table 143 maps object names 146 to user friendly names 149 for a respective printer 103.

To provide an illustration of the operation of the remote printer management network 100, assume that a user of the remote client 106 wishes to obtain access to status information associated with the printer 103 or wishes to manipulate a configuration of the printer 103 from a remote location. If the user is not physically located at the work site 111, then the firewall 112 will operate to prevent most forms of network communication between the remote client 106 and the printer 103. However, email traffic can traverse the firewall 112. Consequently, according to an embodiment of the present invention, email is employed as a transport mechanism to provide remote printer management over the printer 103 by the remote client 106.

To obtain access to status information or to manipulate the configuration of the printer 103, a user manipulates the remote printer management system 133 in the remote client 106 to generate a request/configuration email 153 that is transmitted to the printer 103. In this respect, the remote printer management system 133 may generate the Request/Configuration email 153 itself or may interface with an email system stored in the remote client 106 to generate the Request/Configuration email 153. Once the Request/Configuration email 153 is generated, then the remote printer management system 133 includes the destination email address associated with the printer 103 in the appropriate field of the Request/Configuration email 153. The remote printer management system 133 also includes a service identifier in a predefined portion of the Request/Configuration email 153 such as, for example, in the subject heading of the email. The service identifier indicates which service within the printer 103 is to process the payload of the Request/Configuration email 153.

Then, the user may direct the remote printer management system 133 to write one or more status requests into the Request/Configuration email 153. In this respect, a user may manipulate the remote printer management system 133 to select one or more printer status objects from among a list of selectable printer status objects for which a status request is to be created as will be discussed. The status requests are written using a printer management language that is native to the printer 103. Each status request requests a current status of a corresponding printer status object in the printer 103. In this respect, the management information database 126 includes the state of a plurality of printer status objects in the printer 103 as can be appreciated by those with ordinary skill in the art. Alternatively, the user may direct the remote printer management system 133 to write one more commands to manipulate a configuration of the printer 103 into the Request/Configuration email 153. Such commands are written into the Request/Configuration email 153 in a printer management language that is native to the printer 103. Manipulating the configuration of the printer 103 as contemplated herein includes, for example, rewriting parameters associated with various objects in the printer 103 that effect the operation of the printer 103 in some manner. Such parameters may be those associated with various objects maintained within the management information database 126 within the printer 103. As an additional alternative, a user may write both status requests directed to the printer 103 and commands to manipulate the configuration of the printer 103 into the Request/Configuration email 153.

Once the Request/Configuration email 153 is complete, then the remote printer management system 133 transmits the Request/Configuration email 153 to the printer 103 or initiates the transmission of the same through a separate email system resident in the remote client 106. In this respect, the Request/Configuration email 153 is then transmitted to the destination email address associated with the printer 103.

Upon receiving the Request/Configuration email 153 from the remote client 106, the web server 113 requests the email service 116 within the printer 103 to parse the Request/Configuration email 153 to determine which service within the printer 103 is to process the payload included within the Request/Configuration email 153. In this respect, the web server 113 may request that the email service 116 parse the email to identify the information stored in the subject heading. The email service 116 thus returns the service identifier back to the web server 113. Given that the service identifier identifies the printer management interface service 119, then web server 113 forwards the email thereto.

The printer management interface service 119 then requests the email service 116 to parse the Request/Configuration email 153 to obtain any status requests or commands included, for example, in the body portion of the email. Email service 116 will thus return the status requests and/or the commands as requested. Given that the status requests and/or the commands are expressed in the printer management language that is native to the printer 103, there is no need to perform translations or other similar functions. Rather, the status requests and/or the commands are submitted directly to the internal printer management system 123 without alteration. In response, the internal printer management system 123 obtains a current status of the printer status objects that are the subject of any submitted status requests from the management information database 126. Also, the internal printer management system 123 take such steps as are necessary to alter the printer configuration as dictated by the commands submitted by the printer management interface service 119.

Once a current status of the respective printer status objects is obtained, then the internal printer management system 123 returns the current status of the respective printer status objects to the printer management interface service 119. Likewise, the internal printer management system 123 returns any acknowledgements of any modifications to the printer configuration that have been made in response to any commands received from the printer management interface service 119.

Thereafter, the printer management interface service 119 directs the email service 116 to generate a reply email 156 to the remote client 106 incorporating the current status of the respective printer status objects and any acknowledgements of modifications to the printer configuration into the body of the reply email 156. In response, the email service 116 generates the reply email 156 and writes the current status of the respective printer status objects into the reply email 156. Also, the email service 116 writes all acknowledgments of all modifications made to the printer configuration into the reply email 156. Thereafter, the reply email 156 is transmitted to the remote client 106.

Then, the remote client 106 receives the reply email 156 that indicates the current status of all printer status objects subject to the status requests originally transmitted in the Request/Configuration email 153. In this respect, the current status of the printer status objects is expressed in the printer management language that is native to the printer 103 as no translation is performed within the printer 103. The remote printer management system 133 then proceeds to parse the reply email 156 to identify the current status of all relevant printer status objects. Alternatively, the remote printer management system 133 may direct an email system resident in the remote client 106 to parse the reply email 156 to obtain a current status of all relevant printer status objects. Then, the remote printer management system 133 displays the current status of the respective printer status objects for the user using an appropriate interface rendered on the display device 193. Alternatively, the remote printer management system 133 may simply display the reply email 156 to the user on the display device or may direct an e-mail system to display the reply email 156 for the user, etc.

Initially, the remote printer management system 133 displays the list of selectable printer status objects on an appropriate display device associated with the remote client 106 so that the user may identify those printer status objects for which the current status is to be obtained or for which a command to alter a printer configuration is to be issued.

In displaying the selectable printer status objects, the names of the printer status objects may be displayed in the printer management language that is native to the printer 103. Alternatively, user friendly names may be displayed in the place of the names expressed in the printer management language native to the printer 103. In order to obtain user friendly names for each of the printer status objects, the remote printer management system 133 may communicate with the central server 109. In this respect, the remote printer management system 133 may include, for example, the names of the printer status objects expressed in the printer management language for which user friendly names are desired. The central server 109 may employ an appropriate management information database name conversion table 143 to map such names of the printer status objects 146 to user friendly names 149. The central server 109 may then transmit the user friendly names 149 back to the remote client 106 for display to the user.

Alternatively, the management information databases 126/139 may include user friendly names in association with the names of the printer status objects expressed in the language native to the printer 103. In such case, the remote printer management system 133 may communicate with either the printer 103 or the central server 109 to obtain the user friendly names of the printer status objects for the printer 103 that are presented to user in the remote client 106. In such case, the user friendly names are obtained directly from the management information databases 126/139.

Figure 2:
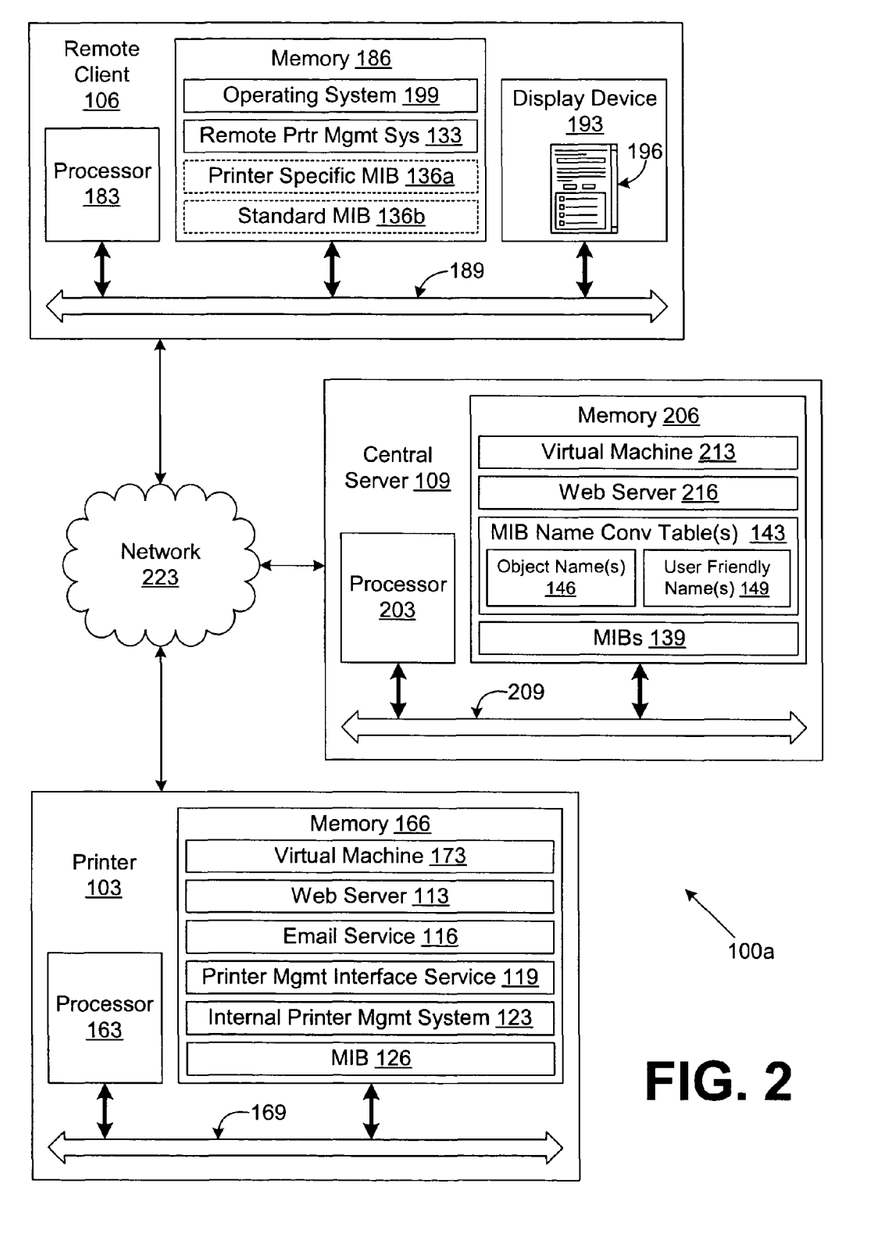
FIG. 2 is a schematic representation of one embodiment of the network of FIG. 1 according to an embodiment of the present invention.

With reference to FIG. 2, shown is an example of one embodiment of the remote printer management network 100 (FIG. 1) denoted herein as remote printer management network 100a. The remote printer management network 100a includes the printer 103, the remote client 106, and the central server 109. The printer 103 includes a processor circuit having a processor 163 and a memory 166, both of which are coupled to a local interface 169. The local interface 169 may be, for example, a data bus with an accompanying control/address bus as can be appreciated by those with ordinary skill in the art. The processor circuit within the printer 103 is employed to orchestrate the operation of various functions of the printer 103 to cause the printing of documents and the like. Such functionality is well known to those skilled in the art and, consequently, is not discussed herein in detail.

In addition, the processor circuit in the printer 103 is employed to execute various components stored on the memory 106 and executable by the processor 163. These components include, for example, a Virtual machine 173 such as a JAVA virtual machine. A number of components run on top of the virtual machine 173 such as, for example, the web server 113, the e-mail service 116, and the printer management interface service 119. Also, the internal printer management system 123 may run on top of the virtual machine 173 or by virtue of some other operating system, etc. The internal printer management system 123 maintains the management information database 126 during the course of the operation of the printer 103.

The remote client 106 also includes a processor circuit comprising a processor 183 and a memory 186, both of which are coupled to a local interface 189. The local interface 189 may be, for example, a data bus with an accompanying control/address bus as can be appreciated by those with ordinary skill in the art. In this respect, the remote client 106 may be, for example, a computer system, personal digital assistant, or other device with like capability. The remote client 106 also includes a display device 193 upon which images are rendered for display to the user. Such images may comprise, for example, one or more user interfaces 196 that are generated by the execution of one or more software components in the memory 186 by the processor 183.

Stored on the memory 186 and executable by the processor 183 are a number of components such as, for example, an operating system 199 and the remote printer management system 133. In addition, various management information databases 136 (FIG. 1) may be stored in the memory 186 and accessed by the remote printer management system 133 as needed. The management information databases 136 may include, for example, a printer specific management information database 136a or a standard management information database 136b. The printer specific management information database 136a includes printer status objects that may be unique to the respective printer 103. The standard management information database 136b includes printer status objects that are specified, for example, by various standards bodies that are typically employed in many printers built by various printer manufacturers. The remote printer management system 133 may consult any one of the management information databases 136 stored in memory 186 as necessary during the execution of the remote printer management system 133 itself as will be described. Generally, the standard management information database 136b is consulted as a default.

The central server 109 also includes a processor circuit having a processor 203 and a memory 206, both of which are coupled to a local interface 209. The local interface 209 may be, for example, a data bus with an accompanying control/address bus as can be appreciated by those with ordinary skill in the art. Stored on the memory 206 and executable by the processor 203 is a Virtual machine 213 such as a Java virtual machine and a web server 216 or other type of network server. Also stored in the memory 206 may be the management information database name conversion tables 143 that map various object names 146 to user friendly names 149. In addition, one or more management information databases 139 may be stored in the memory 206 for transmission to the remote client 106 as necessary.

The printer 103, remote client 106, and the central server 109 are all in data communication with each other by virtue of a network 223. In this respect, the network 223 may comprise, for example, the Internet, intranets, wide area networks (WANs), local area networks, wireless networks, or other suitable networks, etc., or any combination of two or more such networks. The display device 193 may be, for example, a cathode ray tube (CRT), liquid crystal display screen, gas plasma-based flat panel display, or other types of display device, etc. In addition, various input devices may be employed by the printer 103, remote client 106, or the central server 109 such as, for example, keyboards, keypads, a mouse, microphones, or other input devices as can be appreciated by those with ordinary skill in the art.

Each of the memories 166, 186, and 206 is defined herein as both volatile and nonvolatile memory and data storage components. Volatile components are those that do not retain data values upon loss of power. Nonvolatile components are those that retain data upon a loss of power. Thus, each of the memories 166, 186, and 206 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, as stated above, various components are stored in the memories 166, 186, and 206 that are executable by the respective processors 163, 183, and 203. In this respect, the term "executable" means a program file that is in a form that can ultimately be run by the processors 163, 183, and 203. Examples of executable programs may be, for example, a compiled program that can be translated into machine code in a format that can be loaded into a random access portion of the memory 166, 186, and 206 and run by the respective processors 163, 183, and 203, or source code that may be expressed in proper format such as object code that is capable of being loaded into a random access portion of the memories 166, 186, and 206 and executed by the respective processors 163, 183, and 203, etc. An executable program may be stored in any portion or component of the memories 166, 186, and 206 including, for example, random access memory, read-only memory, a hard drive, compact disk (CD), floppy disk, or other memory components.

Also, each of the processors 163, 183, and 203 may represent multiple processors and each of the memories 166, 186, and 206 may represent multiple memories that operate in parallel processing circuits, respectively. In such a case, each of the local interfaces 169, 189, 209 may be an appropriate network that facilitates communication between any two of the multiple processors, between any processor and any of the memories, or between any two of the memories, etc. The processors 163, 183, and 203 may be of electrical, optical, or molecular construction, or of some other construction as can be appreciated by those with ordinary skill in the art.

The operating system 199 is executed to control the allocation and usage of hardware resources such as the memory, processing time and peripheral devices in the remote client 106. In this manner, the operating system 199 serves as the foundation on which applications depend as is generally known by those with ordinary skill in the art.

Figure 3A:
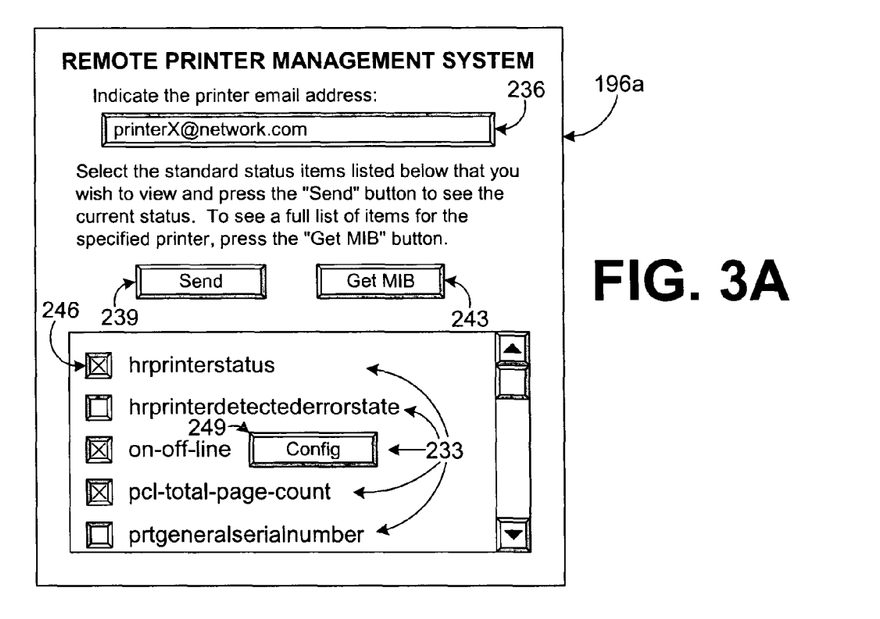
FIG. 3A is an example of a user interface generated on a remote client in the network of FIG. 1 according to an embodiment of the present invention.

Referring next to FIG. 3A, shown is an example of the user interface 196 (FIG. 2) denoted herein as user interface 196*a* that is rendered on the display device 193 (FIG. 2) to facilitate a selection of one more printer status objects 233 for which the user wishes to obtain the current status in the printer 103 (FIG. 2). The user interface 196*a* also facilitates a user configuration of various printer status objects 233 as will be described. The user interface 196*a* includes a printer e-mail address field 236 within which the user may specify a destination e-mail address associated with the printer 103. The user interface 196*a* also includes a "Send" button 239 that may be manipulated by the user to initiate a generation of the Request/Configuration email 153 after the user selects or configures one or more of the selectable printer status objects 233. In addition, the user interface 196*a* includes a "Get MIB" button 243 that may be manipulated by a user to cause the remote printer management system 133 to procure a printer specific management information database 136*b* (FIG. 2) associated with a respective printer 103 indicated in the printer e-mail address field 236. In this respect, the remote printer management system 133 may obtain a printer specific management information database 136*b* from the printer 103 itself or from the central server 109. As a default, the printer status objects 233 from the standard management information database 136*b* stored in the memory 186 (FIG. 2) of the remote client 106 (FIG. 2) are initially displayed in the user interface 196*a*. If the user manipulates the "Get MIB" button 243, then the remote printer management system 133 takes steps to obtain the printer status objects indicated in a printer specific management interface database 136*a* associated with the printer 103 identified in the printer email address field 236.

If obtaining the printer specific management information database 136*b* from the central server 109, once the "Get MIB" button 243 has been manipulated, then the remote printer management system 133 may communicate with the central server 109 using appropriate protocols such as, for example, hypertext transfer protocol (HTTP), file transfer protocol (FTP), or other appropriate protocol to obtain a copy of the appropriate management information database 139 associated with the respective printer 103. In this respect, the remote printer management system 133 may communicate printer identification information that is employed by the central server 109 to identify the precise printer specific management information database 139 that is to be transmitted to the remote client 106. In this respect, the printer identification information may be obtained from the printer 103 by transmitting an appropriate request embodied in an appropriate email as was described above.

Alternatively, the remote printer management system 133 may generate an initial email or may direct an e-mail system within the remote client 106 to generate such initial email. Thereafter, the remote printer management system 133 may write or direct an e-mail system to write a request for a list of selectable printer status objects 233 into the initial email. In one embodiment, the request is expressed in the printer management language native to the printer 103. Thereafter, the initial email is transmitted to the printer 103. In response, the printer 103 generates an initial reply email that includes the list of selectable printer status objects 233 in a manner similar to that discussed above in obtaining a current status for various printer status objects 233. Thereafter, the web server 113 in the printer 103 transmits the initial reply email to the remote printer management system 133 in the remote client 106. The remote printer management system 133 then parses the initial reply email or directs an e-mail system within the remote client 106 to parse the initial reply email to obtain the list of selectable printer status objects therefrom.

Once the list of selectable printer status objects is obtained, then the remote printer management system 133 replaces the printer status objects 233 that were obtained from a standard management information database 136*b* as a default with the list of selectable printer status objects that were obtained. Regardless of whether the standard or printer specific MIB 136*a*/136*b* are displayed, the user may select specific printer status objects 233 for which the current status is desired by manipulating the appropriate selectors 246. Also, some of the printer status objects 233 may be configurable by the user. In such case, a "Configure" button 249 is associated with such printer status objects 233. By manipulating the appropriate Configure button 249, the user is provided with the ability to specify a particular state for the respective printer status object 233 as will be described.

Figure 3B:
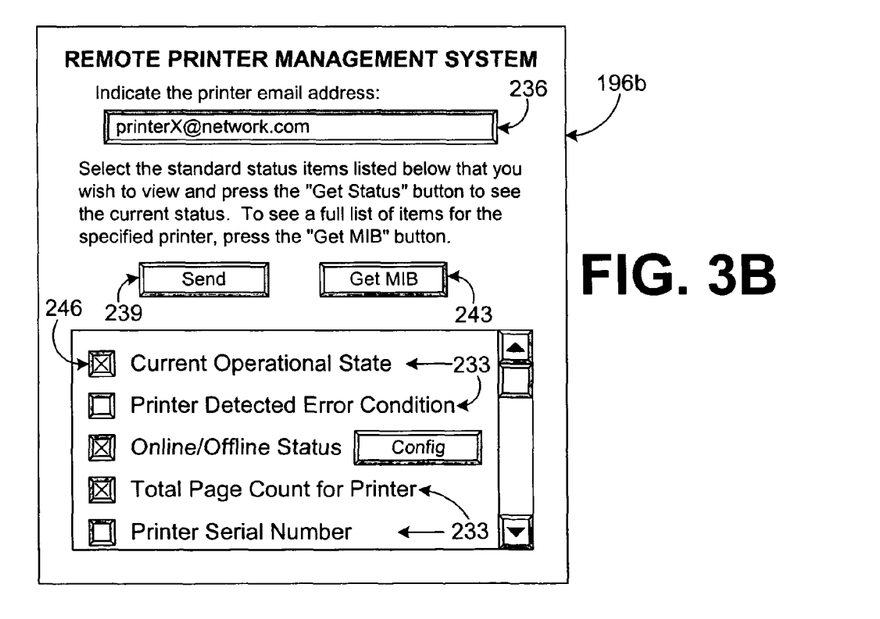
FIG. 3B is a second example of a user interface generated on a remote client in the network of FIG. 1 according to an embodiment of the present invention.

With reference to FIG. 3B, shown is another example of the user interface 196 (FIG. 2) denoted herein as user interface 196*b*. The user interface 196*b* differs from the user interface 196*a* (FIG. 3A) in that the names of the printer status objects 233 are user friendly names 149 (FIG. 1). In this respect, the remote printer management system 133 obtains the user friendly names 149 by communicating with the central server 109 that provides such information by mapping the names of printer status objects 233 expressed in the printer management language native to a respective printer 103 to the user friendly names 149. Alternatively, the user friendly names 149 may be included in the management information databases 126/139 and may be obtained therefrom as described above. The remote printer management system 133 may be configured by the user to display the names in a printer management language or as user friendly names.

Figure 3C:
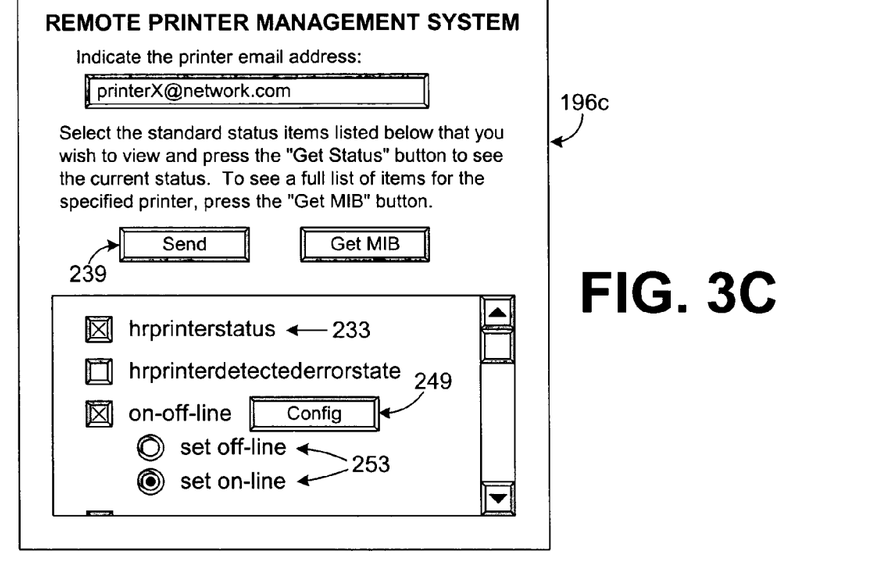
FIG. 3C is a third example of a user interface generated on a remote client in the network of FIG. 1 according to an embodiment of the present invention.

With reference to FIG. 3C, shown is yet another example of the user interface 196 (FIG. 2) denoted herein as user interface 196*c*. The user interface 196 includes printer configuration elements 253 that may be manipulated by a user to configure a state of a particular printer status object in the printer 103 (FIG. 2). Specifically, when the user manipulates the "Configure" button 249 that is associated with a particular printer status object 233, then the remote printer management system 133 renders the printer configuration elements 253 on the display device 193 (FIG. 2) so that a user may indicate the desired state of the respective printer status object 233. Thereafter, when the user manipulates the "Send" button 239, the remote printer management system 133 includes appropriate commands in the Request/Configuration email 153 to cause the state of the respective printer status objects 233 to be altered according to the wishes of the user.

Figure 3D:
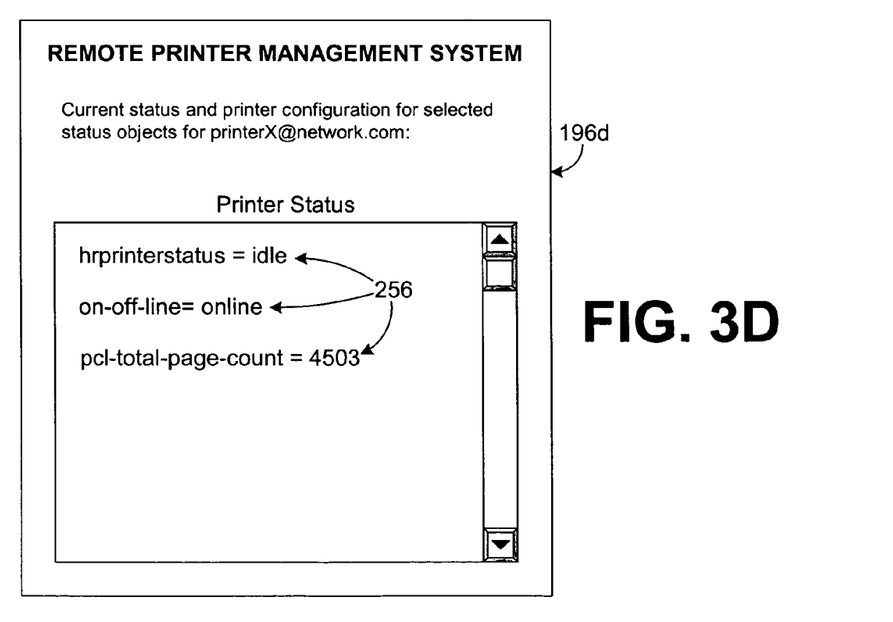
FIG. 3D is a fourth example of a user interface generated on a remote client in the network of FIG. 1 according to an embodiment of the present invention.

Referring next to FIG. 3D shown is still another example the user interface 196 (FIG. 2) denoted herein as user interface 196d. The user interface 196d facilitates the display of the current status 256 of selected printer status objects 233 (FIG. 3A). Alternatively, the current status 256 of the selected printer status objects 233 may be rendered as they appear in the reply email 156 by the remote printer management system 133 or by an e-mail system in the remote client 106.

Figure 4:
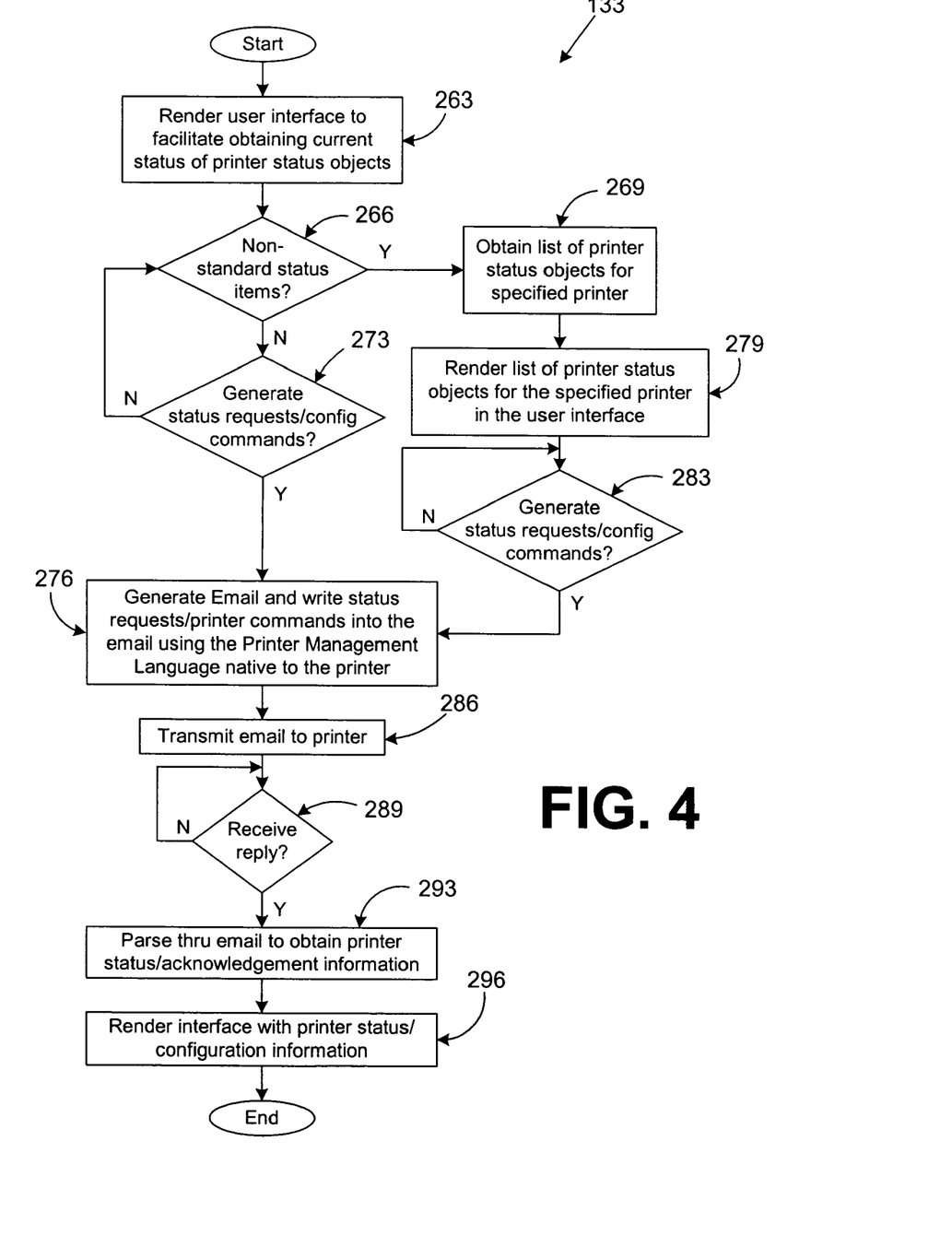
FIG. 4 is a flow chart that provides an example of the operation of a remote printer management system executed in a remote client in the network of FIG. 1.

Referring next to FIG. 4, shown is a flow chart that provides one example of the operation of the remote printer management system 133 according to an embodiment of the present invention. Alternatively, the flow chart of FIG. 4 may be viewed as depicting steps of an example of a method implemented in the remote client 106 to obtain the status of various printer status objects in a respective printer 103 (FIG. 2). The functionality of the remote printer management system 133 as depicted by the example flow chart of FIG. 4 may be implemented, for example, in an object oriented design or in some other programming architecture. Assuming the functionality is implemented in an object oriented design, then each block represents functionality that may be implemented in one or more methods that are encapsulated in one or more objects. The remote printer management system 133 may be implemented using any one of a number of programming languages such as, for example, C, C++, or other programming languages.

Beginning with box 263, the remote printer management system 133 renders the user interface 196a (FIG. 3A) or the user interface 196b (FIG. 3B) to facilitate a user selection of one or more printer status objects 233 (FIG. 3A) from among a list of selectable printer status objects 233 for which the status is to be obtained. In this respect, the list of selectable printer status objects 233 is initially generated from a standard management information database 136b (FIG. 2). Thereafter, in box 266, the remote printer management system 133 determines if the user wishes to obtain the names of printer status objects 233 associated with a printer specific management information database 136a (FIG. 2) of a respective printer 103 (FIG. 2). For example, if the user manipulates the "Get MIB" button 243 (FIG. 3A) then the remote printer management system 133 proceeds to box 269. Otherwise the remote printer management system 133 proceeds to box 273.

In box 273, the remote printer management system 133 determines whether any status requests and/or Configuration commands are to be generated for the selected ones of the printer status objects 233 indicated in the user interface 196a/b. Such may be the case, for example, when the user manipulates the "Send" button 239 (FIG. 3A) as described above. If such is the case, then the remote printer management system 133 proceeds to box 276. Otherwise, the remote printer management system 133 reverts back to box 266. In this respect, once the user interface 196a/b has been rendered for the user, the remote printer management system 133 waits until the user indicates that they wish for the Request/Configuration email 153 to be submitted to the printer 103 or that the user wishes to obtain a listing of the printer status objects for a specific printer 103. If the user indicates that they wish to submit the request/configuration e-mail 153 to a printer 103, then it is assumed that they have made all of their selections of respective printer status objects 233 and have configured all printer configuration elements 253 (FIG. 3C) as described above.

With reference back to box 269, assuming that the user has indicated that they wish to obtain a listing of printer status objects 233 from a printer specific management information database 136a (FIG. 2), then in box 269 the remote printer management system 133 obtains a listing of the selectable printer status objects 233 associated with a particular management information database 126/139 from either the printer 103 using email or from the central server 109 (FIG. 1) using appropriate protocol as described above. Thereafter, in box 279, the remote printer management system 133 renders the respective user interface 196a/b with a listing of the printer status objects obtained in box 269 from the respective printer specific management information database 136a.

In generating the user interfaces 196a/b as described herein, the remote printer management system 133 may communicate with the central server 109 as necessary to obtain user friendly names 149 of respective printer status objects 233 if they are to be displayed as configured by the user. Alternatively, if the various management information databases 126/139 include the user friendly names 149, then the user friendly names 149 may be obtained therefrom in box 269.

From box 279, the remote printer management system 133 proceeds to box 283 in which the remote printer management system 133 determines whether any status requests and/or Configuration commands are to be generated for the selected ones of the printer status objects 233 indicated in the user interface 196a/b. If so, then the remote printer management system 133 proceeds to box 276.

In box 276, the remote printer management system 133 generates the request/configuration email 153 or directs an email system within the remote client 106 to generate the same and then writes or directs the email system to write any status requests associated with selected objects and/or any commands associated with user configuration specifications into the request/configuration email 153. Thereafter, in box 286 the remote printer management system 133 transmits or initiates the transmission of the request/configuration email 153 to the respective printer 103 at the destination email address specified by the user. Then, in box 289, the remote printer management system 133 waits until a reply email 156 (FIG. 1) is received from the printer 103. After the reply email 156 arrives, the remote printer management system 133 proceeds to box 293 in which the reply email 156 is parsed by the remote printer management system 133 or by an email system at the direction of the remote printer management system 133 to obtain the printer status/acknowledgement information associated with the specified printer status objects 233 from the reply email 156. Thereafter, the user interface 196d (FIG. 3D is rendered on the display device 193 (FIG. 2) to display the current status 256 to the user. Alternatively, the reply email 156 itself may be displayed by the remote printer management system 133 or by an email system in the remote client 106. Thereafter, the remote printer management system 133 ends as shown.

Figure 5:
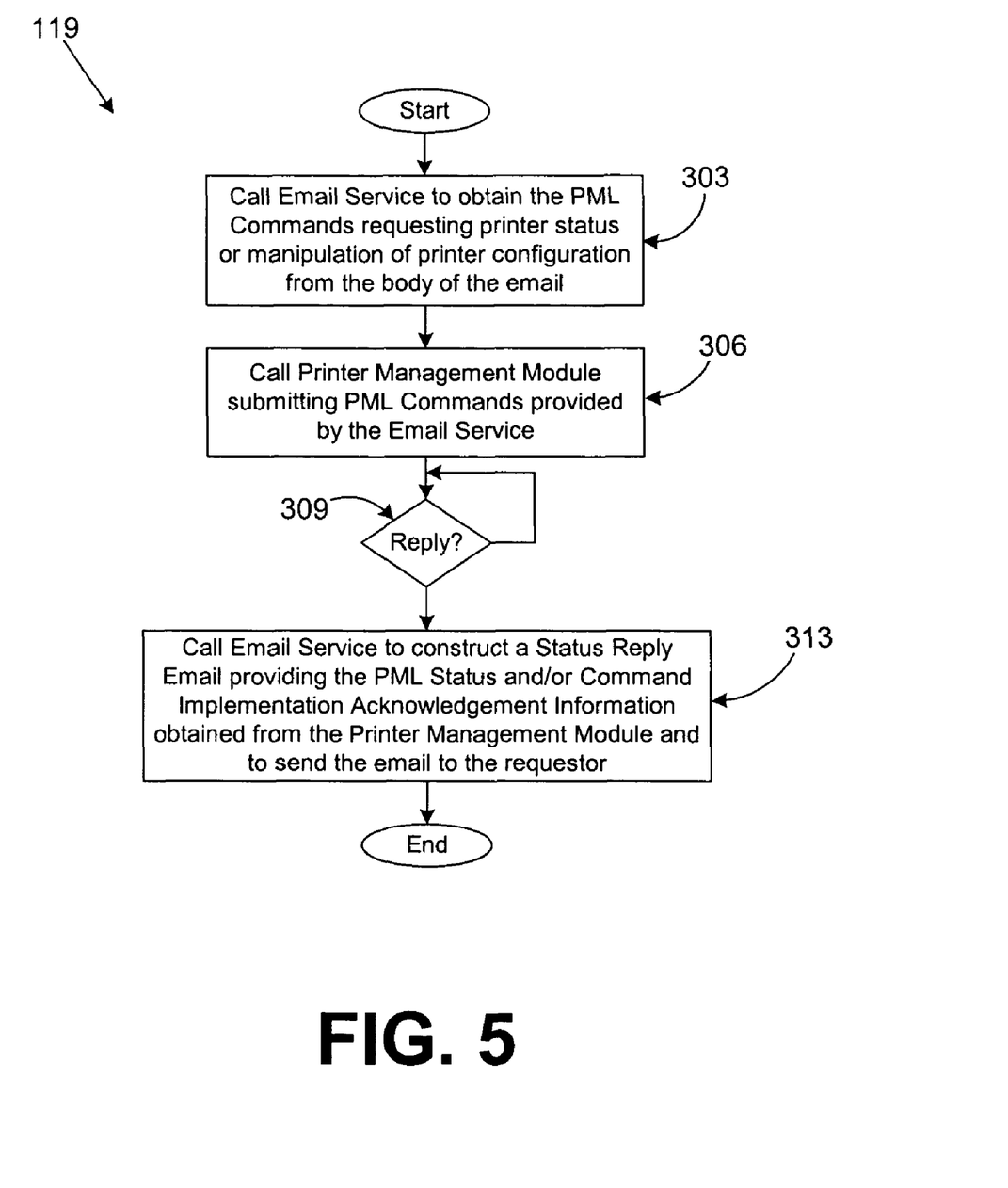
FIG. 5 is a flow chart that provides an example of the operation of a status management service in a printer in the network of FIG. 1 that facilitates providing printer status information and facilitates manipulation of printer configuration within the printer in response to commands from a remote client in the network of FIG. 1.

Referring next to FIG. 5, shown is a flow chart that provides one example of the operation of the printer management interface service 119 according to an embodiment of the present invention. Alternatively, the flow chart of FIG. 5 may be viewed as depicting steps of an example of a method implemented in the printer 103 (FIG. 1) to act as an interface with the internal printer management system 123 (FIG. 1) in the printer 103 to facilitate providing printer status information to the remote client 106 (FIG. 1). The functionality of the printer management interface service 119 as depicted by the example flow chart of FIG. 5 may be implemented, for example, in an object oriented design or in some other programming architecture. Assuming the functionality is implemented in an object oriented design, then each block represents functionality that may be implemented in one or more methods that are encapsulated in one or more objects. The printer management interface service 119 may be implemented using any one of a number of programming languages such as, for example, C, C++, JAVA, or other programming languages.

Beginning with box 303, the printer management interface service 119 calls the email service 116 (FIG. 1) to obtain the status requests and commands expressed in the printer management language (PML) native to the printer 103 from the body of the request/configuration email 153. Then, in box 306, the printer management interface service 119 submits the status requests and commands to the internal printer management system 123. Thereafter, in box 309, the printer management interface service 119 waits for a reply from the internal printer management system 123. Assuming a reply is received, then in box 313, the printer management interface service 119 requests the email service 116 to construct the reply email 156. The printer management interface service 119 provides the current status and/or acknowledgement of printer configuration modifications to the email service 116 to include in or write into the reply email 156. The printer management interface service 119 also directs the email service 116 to transmit the reply email 156 to the remote client 106. Thereafter, the printer management interface service 119 ends as shown.

In addition, it is understood that the remote printer management system 133 and the printer management interface system 119 may include other functionality not discussed herein.

Although the remote printer management system 133 and/or the printer management interface system 119 are embodied in software or code executed by general purpose hardware as discussed above, as an alternative each may also be embodied in dedicated hardware or a combination of software/general purpose hardware and dedicated hardware. If embodied in dedicated hardware, the remote printer management system 133 and/or the printer management interface system 119 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow charts of FIGS. 4 and 5 show the architecture, functionality, and operation of an implementation of the remote printer management system 133 and the printer management interface system 119. If embodied in software, each block or other element may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

The flow charts of FIGS. 4 and 5 show a specific order of execution, it is understood that the order of execution may differ from that which is depicted. For example, the order of execution of two or more blocks may be scrambled relative to the order shown. Also, two or more blocks shown in succession in FIGS. 4 and 5 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the remote printer management system 133 and/or the printer management interface system 119 comprises software or code, each can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the remote printer management system 133 and/or the printer management interface system 119 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A method for remotely monitoring a printer status, comprising the steps of:
    displaying a list of selectable printer status objects on a display device in a remote client in data communication with a printer, where a name of each of the printer status objects is displayed in a printer management language native to the printer;
    selecting one of the printer status objects from the list of selectable printer status objects in the remote client;
    generating an email in the remote client;
    writing a status request into the email in a printer management language native to the printer, the status request requesting a current status of the selected one of the printer status objects in the printer;

transmitting the email to the printer; and receiving a reply email from the printer that includes the current status, of the selected one of the printer status objects in the printer, the current status being expressed in the printer management language native to the printer.

2. The method of claim 1, further comprising the steps of:

generating an initial email in the remote client;

writing a request for the list of selectable printer status objects into the initial email;

receiving an initial reply email from the printer, the initial reply including the list of selectable printer status objects; and parsing the initial reply email to obtain the list of selectable printer status objects from the initial reply email.

3. The method of claim 1, further comprising the step of obtaining the list of selectable printer status objects from a server in data communication with the remote client.

4. The method of claim 1, further comprising the steps of;

parsing the reply email to identify the current status of the selected one of the printer status objects; and displaying the current status associated with the selected one of the printer status objects.

5. The method of claim 1, further comprising the step of displaying the reply email with the current status of the printer status object.

6. A system for remotely monitoring printer status, comprising:

a processor circuit having a processor and a memory;

a remote printer management system stored in the memory and executable by the processor, the printer monitoring system comprising:

logic that displays a list of selectable printer status objects on a display device by displaying a name of each of the printer status objects in a printer management language native to a printer;

logic that facilitates a selection of one of the printer status objects from among the list of selectable printer status objects;

logic that generates an email to be transmitted to a printer;

logic that writes a request for a status of the selected one of the printer status objects in the printer into the email, the request being expressed in the printer management language native to the printer; and logic that transmits the email to the printer to receive a reply email from the printer that includes the current status of the selected one of the printer status objects in the printer.

7. The system of claim 6, wherein the remote printer management system further comprises:

logic that generates an initial email to be transmitted to the printer;

logic that writes a request for the list of selectable printer status objects into the initial email; and logic that parses an initial reply email received from the printer to identify the list of selectable printer status objects included in the initial reply email.

8. The system of claim 6, wherein the remote printer management system further comprises logic that requests the list of selectable printer status objects from a server through a network.

9. The system of claim 6, wherein the remote printer management system further comprises:

logic that parses the reply email to identify the current status of the selected one of the printer status objects included therein; and logic that displays the current status associated with the selected one of the printer status objects.

10. A program stored in a computer-readable medium for remotely monitoring printer status, comprising:

code that displays a list of selectable printer status objects on a display device by displaying a name of each of the printer status objects in a printer management language native to a printer;

code that facilitates a selection of one of the printer status objects from among the list of selectable printer status objects specified in a management information base (M1B) applicable to a printer;

code that generates an email to be transmitted to the printer;

code that writes a request for a status of the selected one of the printer status objects in the printer into the email, the request being expressed in the printer management language native to the printer; and code that transmits the email to the printer to receive a reply email from the printer that includes the current status of the selected one of the printer status objects in the printer.

11. The program stored in a computer-readable medium of claim 10, further comprising:

code that generates an initial email to be transmitted to the printer;

code that writes a request for the list of selectable printer status objects into the initial email; and code that parses an initial reply email received from the printer to identify the list of selectable printer status objects included in the initial reply email.

12. The program stored in a computer-readable medium of claim 10, further comprising code that requests the list of selectable printer status objects from a server through a network.

13. The program stored in a computer-readable medium of claim 10, further comprising:

code that parses the reply email to identify the current status of the selected one of the printer status objects included therein; and code that displays the current status associated with the selected one of the printer status objects.

14. A system for remotely monitoring printer status, comprising:

means for displaying a list of selectable printer status objects on a display device by displaying a name of each of the printer status objects in a printer management language native to a printer;

means for facilitating a selection of one of the printer status objects from the list of selectable printer status objects specified in a management information base (MIB) applicable to a printer;

means for generating an email to be transmitted to the printer;

means for writing a request for a status of the selected one of the printer status objects in the printer into the email, the request being expressed in the printer management language native to the printer; and means for transmitting the email to the printer to receive a reply email from the printer that includes the current status of the selected one of the printer status objects in the printer.

15. A method for remotely configuring a printer, comprising the steps of:

displaying a list of selectable printer status objects on a display device by displaying a name of each of the printer status objects in a printer management language native to a printer;

selecting a printer status object from among the list of selectable printer status objects in a remote client in data communication with a printer; generating an email in the remote client;

writing a command to manipulate a configuration of the printer into the email in the printer management language native to the printer;

transmitting the email to the printer;

and receiving a reply email from the printer that acknowledges a modification of the configuration of the printer in response to the command.

* * * * *

UNITED STATES PATENT AND TRADEMARK OFFICE
CERTIFICATE OF CORRECTION

| | | |
|---|---|---|
| PATENT NO. | : 7,599,083 B2 | Page 1 of 1 |
| APPLICATION NO. | : 10/650165 | |
| DATED | : October 6, 2009 | |
| INVENTOR(S) | : Curtis Reese et al. | |

It is certified that error appears in the above-identified patent and that said Letters Patent is hereby corrected as shown below:

In column 13, line 5, in Claim 1, delete "status," and insert -- status --, therefor.

In column 13, line 20, in Claim 4, delete "of;" and insert -- of: --, therefor.

In column 14, line 12, in Claim 10, delete "(M1B)" and insert -- (MIB) --, therefor.

Signed and Sealed this

Fourteenth Day of September, 2010

David J. Kappos
*Director of the United States Patent and Trademark Office*